(12) United States Patent
Homma

(10) Patent No.: US 7,442,463 B2
(45) Date of Patent: Oct. 28, 2008

(54) FUEL CELL

(75) Inventor: Hiroki Homma, Asaka (JP)

(73) Assignee: Honda Motor Co., Ltd., Tokyo (JP)

( * ) Notice: Subject to any disclaimer, the term of this patent is extended or adjusted under 35 U.S.C. 154(b) by 747 days.

(21) Appl. No.: 11/021,223

(22) Filed: Dec. 23, 2004

(65) Prior Publication Data
US 2005/0142427 A1   Jun. 30, 2005

(30) Foreign Application Priority Data
Dec. 26, 2003   (JP) ............................. 2003-431940

(51) Int. Cl.
*H01M 8/04* (2006.01)
(52) U.S. Cl. ........................................ 429/39
(58) Field of Classification Search .................. None
See application file for complete search history.

(56) References Cited

U.S. PATENT DOCUMENTS

| 4,678,724 | A   | 7/1987  | McElroy        |       |
|-----------|-----|---------|----------------|-------|
| 2001/0008719 | A1 | 7/2001  | Ikeda          |       |
| 2002/0064702 | A1 | 5/2002  | Gibb           |       |
| 2002/0168561 | A1 | 11/2002 | Boehm et al.   |       |
| 2002/0182474 | A1 | 12/2002 | Saito          |       |
| 2004/0247983 | A1* | 12/2004 | Orishima et al. | 429/38 |

FOREIGN PATENT DOCUMENTS

| EP | 1286404 A2 | 2/2003 |
| EP | 1 445 814 A1 | 8/2004 |
| JP | 10-326624 | 12/1998 |
| JP | 2000-106199 | 4/2000 |
| JP | 2002-075408 | 3/2002 |
| JP | 2002-313361 | 10/2002 |
| JP | 2004-503900 | 2/2004 |
| WO | WO 01/37362 A2 | 5/2001 |
| WO | WO 01/37362 A3 | 5/2001 |
| WO | WO-01/95407 A2 | 12/2001 |
| WO | WO 02/075893 A2 | 9/2002 |
| WO | WO 02/075893 A3 | 9/2002 |
| WO | WO 03/043110 A1 | 5/2003 |

OTHER PUBLICATIONS

Machine translation of JP 2000-106199, Nov. 11, 2000.*
Japanese Office Action for Application No. 2004-343971, dated Dec. 4, 2007.

* cited by examiner

*Primary Examiner*—Jonathan Crepeau
(74) *Attorney, Agent, or Firm*—Lahive & Cockfield, LLP; Anthony A. Laurentano

(57) ABSTRACT

A fuel cell includes an electrolyte electrode assembly and a pair of separators sandwiching the electrolyte electrode assembly. Each of the separators is a single plate, and includes a plurality of circular disks. First protrusions and second protrusions are provided on both surfaces of the circular disk. The first protrusions contact the anode of the electrolyte electrode assembly to form a fuel gas flow field, and the second protrusions contact the cathode of the electrolyte electrode assembly to form an oxygen-containing gas flow field. The shape of the first protrusion is different from the shape of the second protrusion. The first and second protrusions are coaxial with each other.

11 Claims, 17 Drawing Sheets

FUEL CELL

BACKGROUND OF THE INVENTION

1. Field of the Invention

The present invention relates to a fuel cell including an electrolyte electrode assembly and a pair of separators sandwiching the electrolyte electrode assembly. The electrolyte electrode assembly includes an anode, a cathode, and an electrolyte interposed between the anode and the cathode.

2. Description of the Related Art

Typically, a solid oxide fuel cell (SOFC) employs an electrolyte of ion-conductive solid oxide such as stabilized zirconia. The electrolyte is interposed between an anode and a cathode to form an electrolyte electrode assembly (unit cell). The electrolyte electrode assembly is interposed between separators (bipolar plates). In use, a predetermined numbers of the unit cells and the separators are stacked together to form a fuel cell stack.

In the fuel cell, an oxygen-containing gas or air is supplied to the cathode. The oxygen in the oxygen-containing gas is ionized at the interface between the cathode and the electrolyte, and the oxygen ions ($O^{2-}$) move toward the anode through the electrolyte. A fuel gas such as a hydrogen-containing gas or CO is supplied to the anode. Oxygen ions react with the hydrogen in the hydrogen-containing gas to produce water or react with CO to produce $CO_2$. Electrons released in the reaction flow through an external circuit to the cathode, creating a DC electric energy.

In the fuel cell, various proposals for reducing the thickness of the separator and the number of components of the separator have been made. For example, as shown in FIG. 17, according to the disclosure of Japanese Laid-Open Patent Publication No. 2002-75408, a separator 1 of a fuel cell includes a thin sheet of separator body 2, and a large number of first micro-protrusions 3 formed integrally on one surface of the separator body 2, and a large number of second micro-protrusions 4 formed integrally on the other surface of the separator body 2. The first micro-protrusions 3 form a fuel gas flow field 6 between the separator 1 and a fuel electrode 5, and the second micro-protrusions 4 form an oxygen-containing gas flow field 8 between the separator 1 and an air electrode 7.

In Japanese Laid-Open Patent Publication No. 2002-75408, the large number of first protrusions 3 and the large number of second protrusions 4 protrude oppositely from both surfaces of the separator 1. Thus, when a tightening load is applied to the separator 1 and an electrolyte electrode assembly 9 in the stacking direction, the dimensional variations in the height of the first micro-protrusions 3 and the height of the second micro-protrusions 4 in the tightening direction are not absorbed by the separator 1. Therefore, the separator 1 is distorted easily. Consequently, damage or the like may occur in the electrolyte electrode assembly 9 undesirably, and the power generation cannot be carried out efficiently.

SUMMARY OF THE INVENTION

A general object of the present invention is to provide a fuel cell having a simple and compact structure, in which it is possible to suppress the tightening load locally applied to an electrolyte electrode assembly of the fuel cell.

A main object of the present invention is to provide a fuel cell in which the efficient current collection is achieved.

According to the present invention, a fuel cell comprises an electrolyte electrode assembly and a pair of separators sandwiching the electrolyte electrode assembly. The electrolyte electrode assembly includes an anode, a cathode, and an electrolyte interposed between the anode and the cathode. A plurality of first protrusions are provided on one surface (first surface) of the separator such that a first space is formed between the first protrusions and the electrolyte electrode assembly, and a plurality of second protrusions are provided on the other surface (second surface) of the separator such that a second space is formed between the second protrusions and the electrolyte electrode assembly. The shape of the first protrusions is different from the shape of the second protrusions.

It is preferable that the first space forms a fuel gas flow field for supplying a fuel gas along an electrode surface of the anode, and the second space forms an oxygen-containing gas flow field for supplying an oxygen-containing gas along an electrode surface of the cathode.

It is preferable that the first protrusion contacts the anode, and the second protrusion contacts the cathode.

Further, it is preferable that one of the first and second protrusions is an annular protrusion and the other of the first and second protrusions is a mountain shaped protrusion.

It is preferable that the mountain shaped protrusion is disposed in a recess formed by the annular protrusion. With this structure, the tightening load is efficiently transmitted to the electrolyte electrode assembly. Further, since the volume of the gas flow field is not decreased excessively, the pressure loss is not increased excessively, and the desired power generation reaction is induced.

Further, it is preferable that the height of the first protrusion is smaller than the height of the second protrusion, and the first protrusion and the second protrusion are coaxial with each other.

Further, it is preferable that the separator comprises a single plate, and the first protrusion and the second protrusion are provided on the plate by press forming. The first protrusion and the second protrusion may be formed by an etching process or a cutting process.

According to the present invention, the first and second protrusions are provided on a single plate. Therefore, the distance between the first and second protrusions as current collectors is small, and the load in the stacking direction is transmitted efficiently. Further, the dimensional variation of the height does not affect the dimension in the stacking direction since the variation is absorbed by the first and second protrusions. Therefore, variation of the load applied to the electrolyte electrode assembly is prevented. Further, in the presence of the first and second protrusions, the electrolyte electrode assembly tightly contacts the separators for achieving the desired current collection. Therefore, the current loss between the electrolyte electrode assembly and the separators is reduced, and improvement in the current collection efficiency is achieved.

Further, the shape of the first protrusion is different from the shape of the second protrusion. Thus, the volume of the first space and the volume of the second space can be determined separately. Therefore, it is possible to sufficiently supply the desired amount of the reactant gases to the first and second spaces for inducing the desired power generation reactions. Improvement in the current collection efficiency is achieved.

The above and other objects, features and advantages of the present invention will become more apparent from the following description when taken in conjunction with the accompanying drawings in which preferred embodiments of the present invention are shown by way of illustrative example.

DESCRIPTION OF THE PREFERRED EMBODIMENTS

Figure 1:
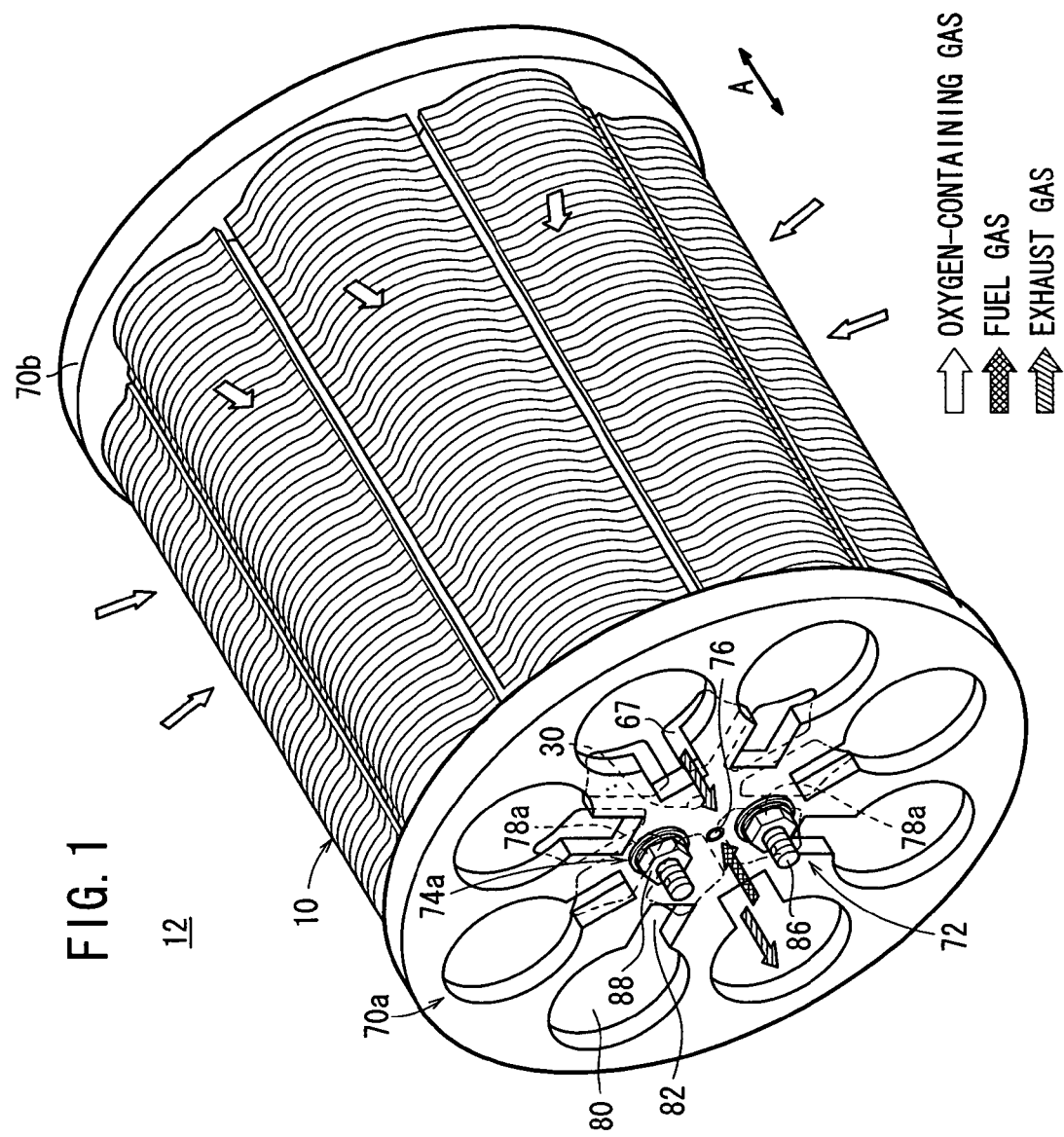
FIG. 1 is a perspective view schematically showing a fuel cell stack formed by stacking a plurality of fuel cells according to a first embodiment of the present invention.
Figure 2:
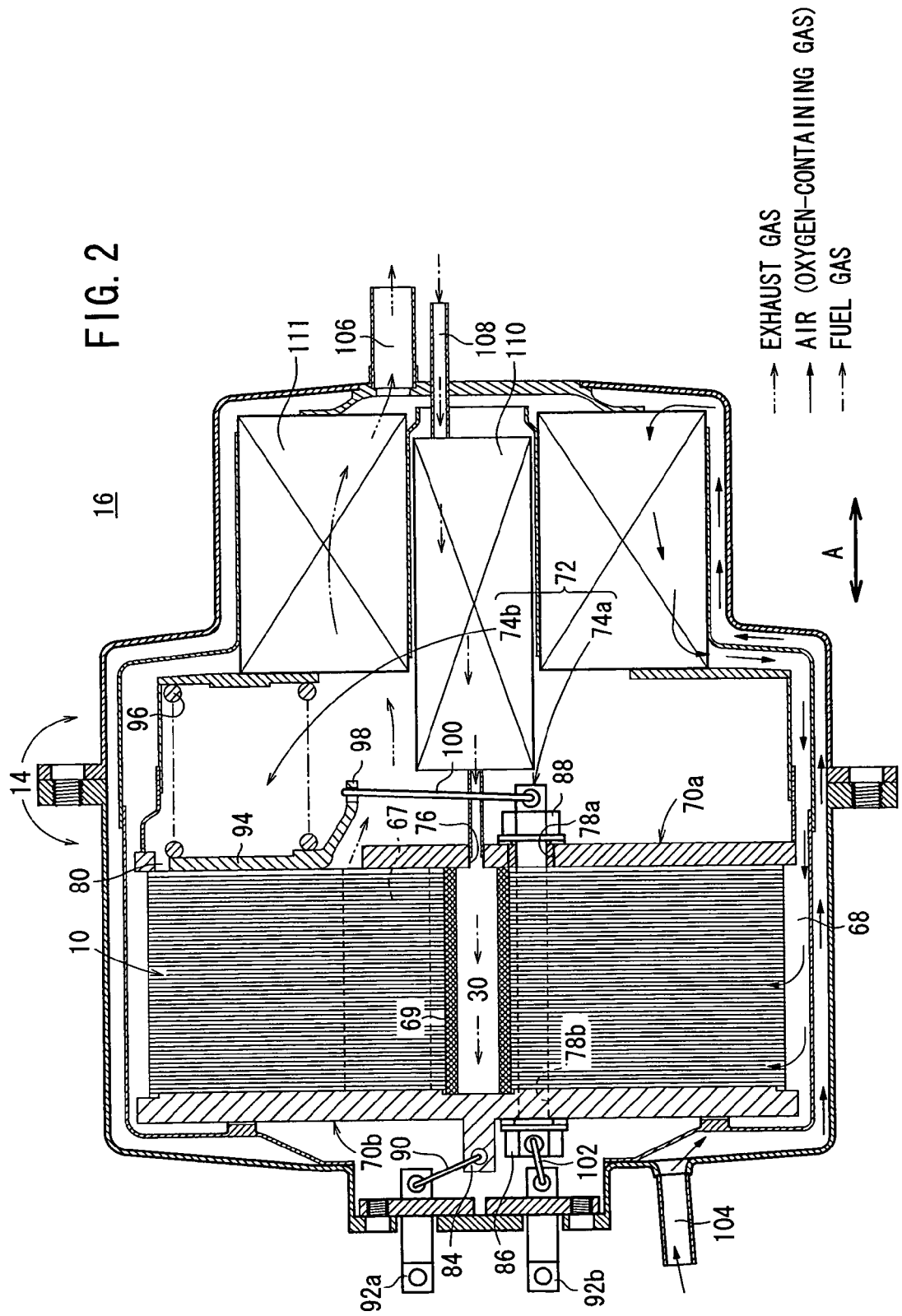
FIG. 2 is a cross sectional view showing part of a fuel cell system in which the fuel cell stack is disposed in a casing.

FIG. 1 is a perspective view schematically showing a fuel cell stack 12 formed by stacking a plurality of fuel cells 10 according to a first embodiment of the present invention indicated by an arrow A. FIG. 2 is a cross sectional view showing part of a fuel cell system 16 in which the fuel cell stack 12 is disposed in a casing 14.

Figure 3:
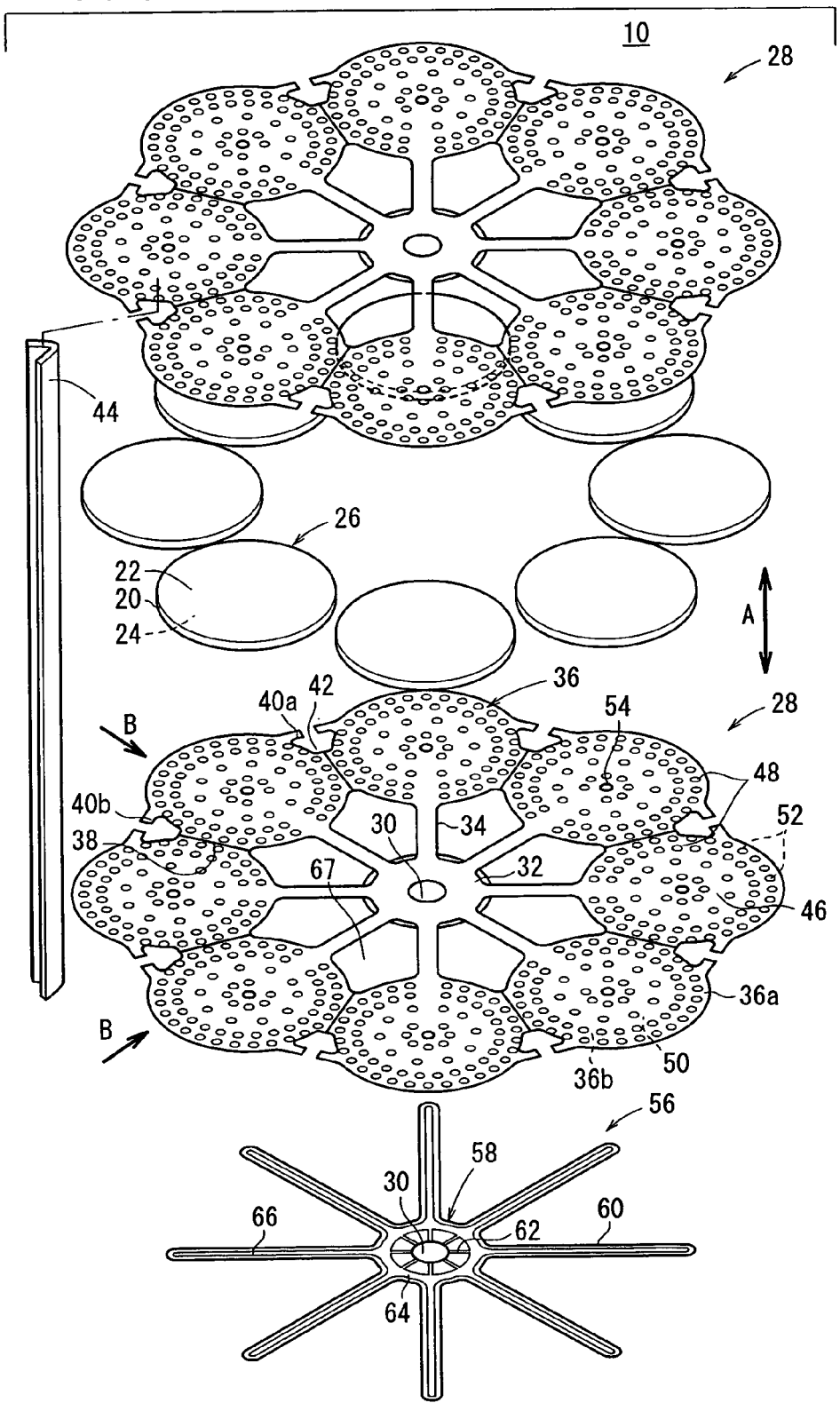
FIG. 3 is an exploded perspective view showing the fuel cell.
Figure 4:
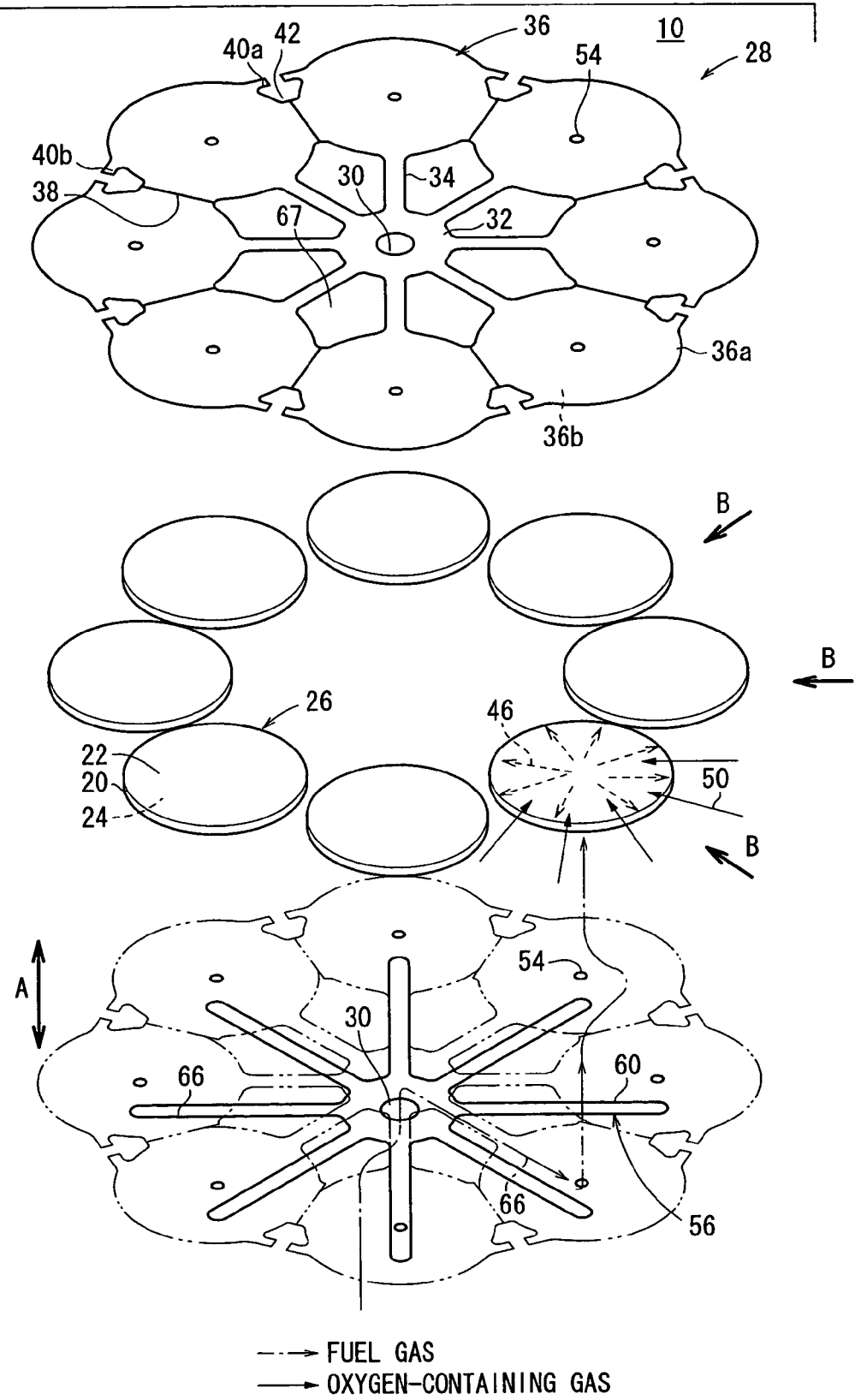
FIG. 4 is a partial exploded perspective view showing gas flows in the fuel cell.

The fuel cell 10 is a solid oxide fuel cell (SOFC) used in various applications, including stationary and mobile applications. As shown in FIGS. 3 and 4, the fuel cell 10 includes electrolyte electrode assemblies 26. Each of the electrolyte electrode assemblies 26 includes a cathode 22, an anode 24, and an electrolyte (electrolyte plate) 20 interposed between the cathode 22 and the anode 24. For example, the electrolyte 20 is made of ion-conductive solid oxide such as stabilized zirconia. The electrolyte electrode assembly 26 has a circular disk shape. The electrolyte electrode assembly 26 includes a barrier layer at least on its outer circumferential end for preventing entry of an oxygen-containing gas.

A plurality of, e.g., eight electrolyte electrode assemblies 26 are interposed between a pair of separators 28 to form the fuel cell 10. The electrolyte electrode assemblies 26 are concentric with a fuel gas supply passage (fuel gas supply unit) 30 extending through the center of the separators 28.

As shown in FIG. 3, for example, each of the separators 28 comprises a metal plate of, e.g., stainless alloy or a carbon plate. The separator 28 has a first small diameter end portion 32. The fuel gas supply passage 30 is formed at the center of the first small diameter end portion 32. The first small diameter end portion 32 is integral with circular disks 36 each having a relatively large diameter through a plurality of first bridges 34. The first bridges 34 extend radially outwardly from the first small diameter end portion 32 at equal angles (intervals). The circular disk 36 and the electrolyte electrode assembly 26 have substantially the same size.

Figure 5:
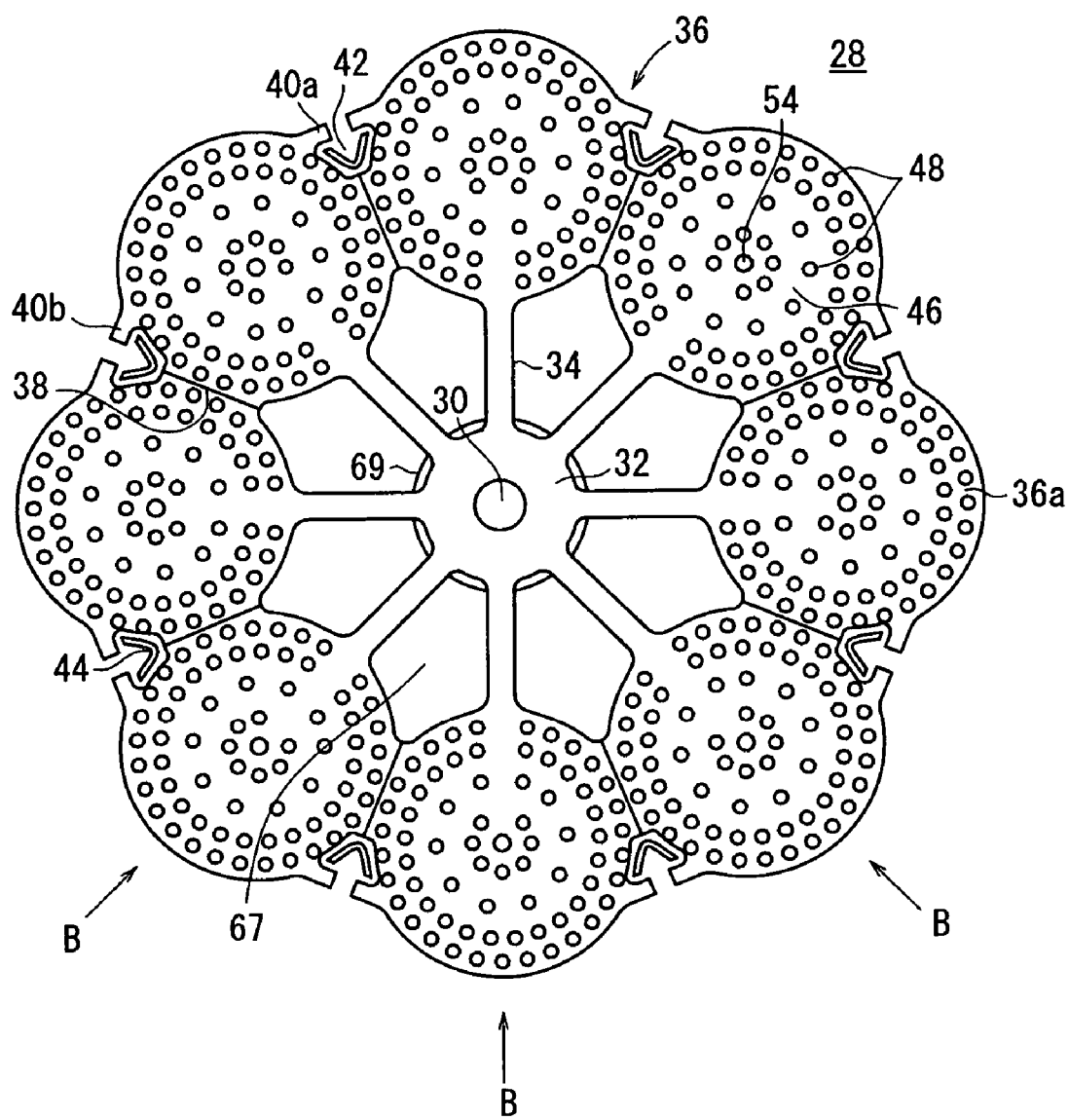
FIG. 5 is a view showing one surface of a separator.
Figure 6:
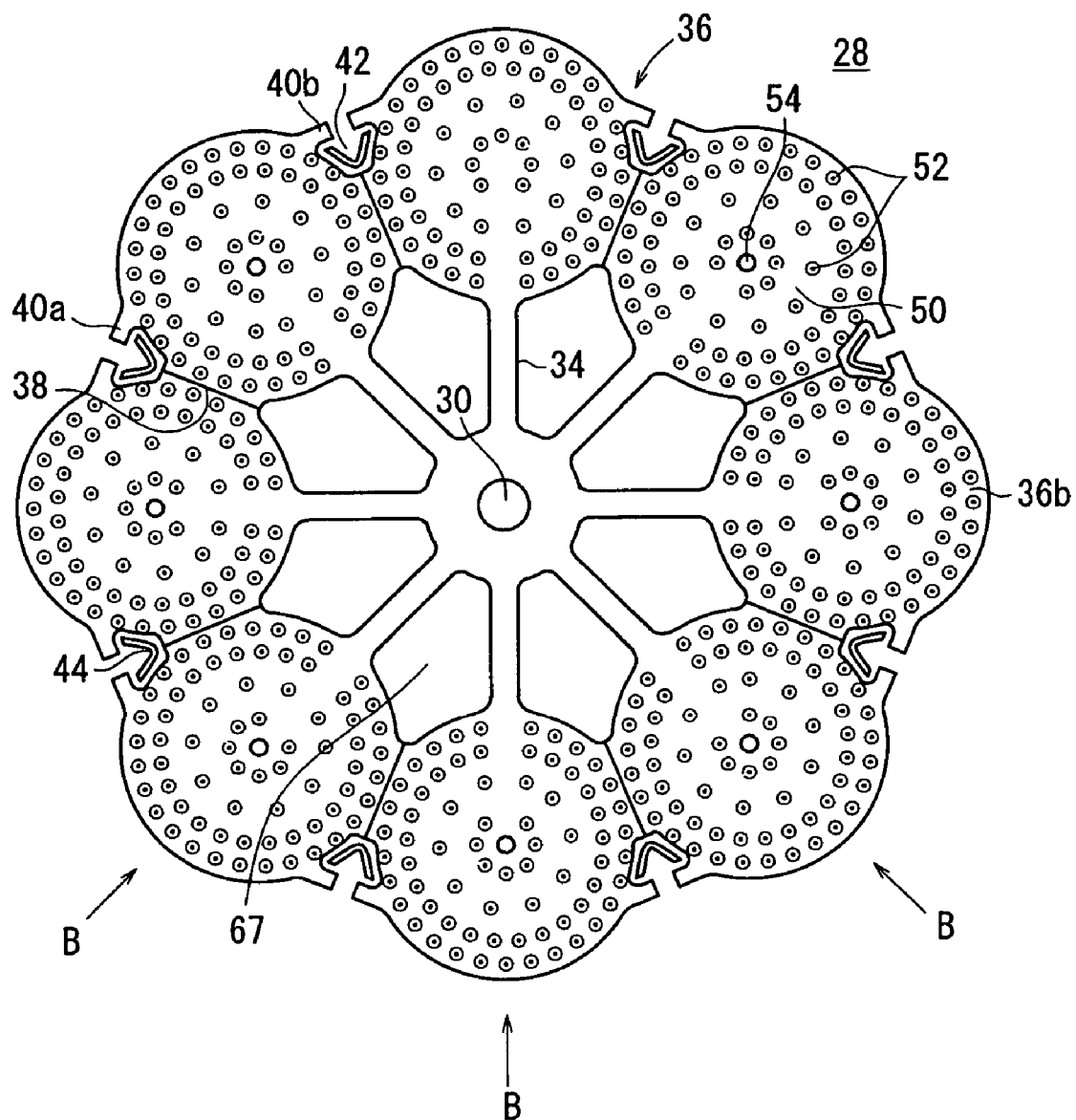
FIG. 6 is a view showing the other surface of the separator.

As shown in FIGS. 3, 5, and 6, the adjacent circular disks 36 are separated from each other through slits 38. Each of the circular disks 36 includes extensions 40a, 40b protruding toward the adjacent circular disks 36 on both sides, respectively. Spaces 42 are formed between the adjacent extensions 40a, 40b. A baffle plate 44 is provided in each of the spaces 42 for preventing the oxygen-containing gas from entering an oxygen-containing gas flow field 50 as described later, in directions other than the flow direction indicated by the arrow B. The baffle plates 44 extend along the spaces 42 in the stacking direction. Though the baffle plate 44 illustrated in FIGS. 3, 5, and 6 has a V-shape, the baffle plate 44 may have any shape as long as the baffle plate 44 is capable of preventing the entry of the oxygen-containing gas.

Figure 7:
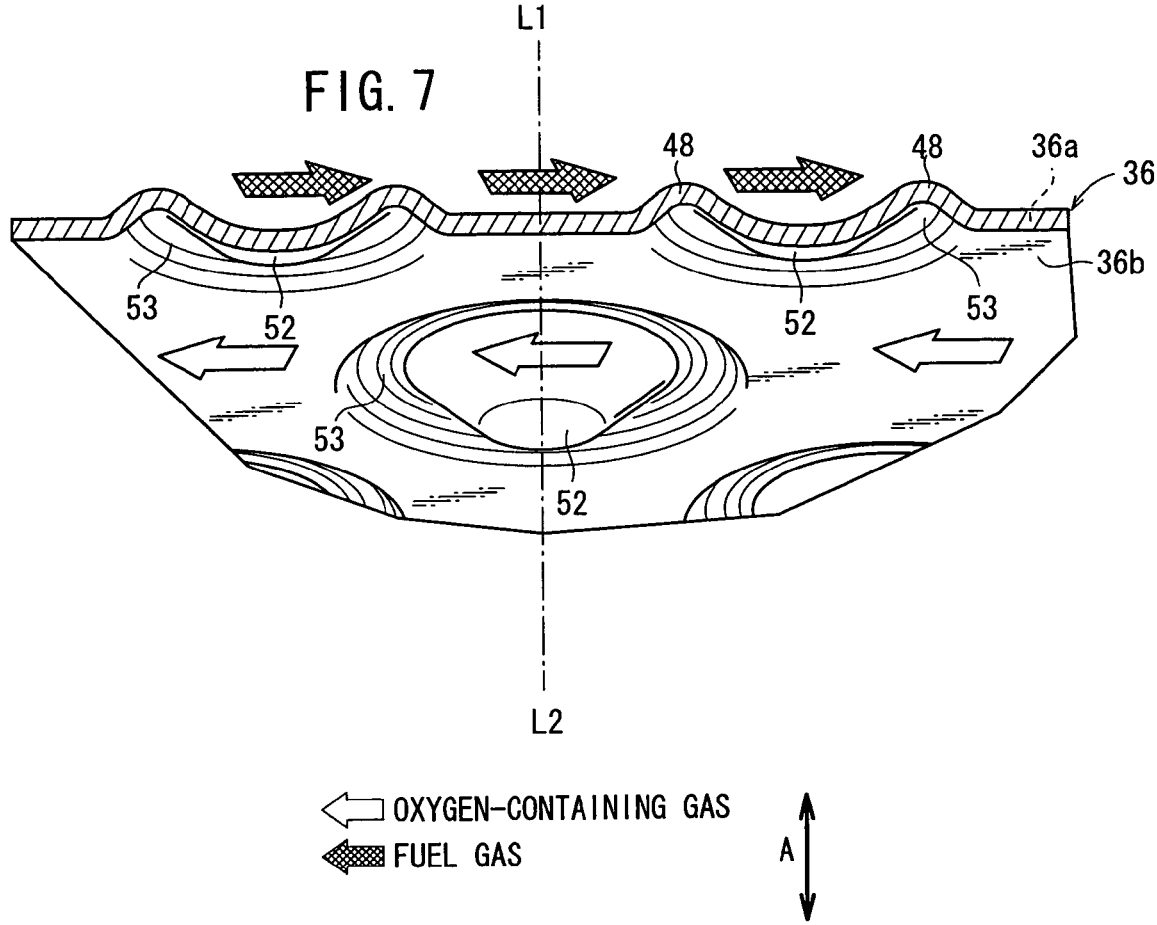
FIG. 7 is a perspective view showing first and second protrusions formed on the separator.

Each of the circular disks 36 has first protrusions 48 on its surface 36a which contacts the anode 24. The first protrusions 48 form a fuel gas flow field (first space) 46 for supplying a fuel gas along an electrode surface of the anode 24 (see FIG. 5). Each of the circular disks 36 has second protrusions 52 on its surface 36b which contacts the cathode 22. The second protrusions 52 form the oxygen-containing gas flow field (second space) 50 for supplying the oxygen-containing gas along an electrode surface of the cathode 22 (see FIG. 6). As shown in FIG. 7, the first protrusions 48 and the second protrusions 52 protrude in opposite directions.

In the embodiment of the present invention, the first and second protrusions 48, 52 are fabricated in different shapes by press forming. For example, the first protrusions 48 are ring shaped protrusions, and the second protrusions 52 are mountain shaped protrusions (the second protrusions 52 have a conical shape having a flat top surface). The second protrusions (mountain shaped protrusions) 52 are surrounded by the first protrusions (ring shaped protrusions) 48.

The second protrusions 52 are formed on the surface where recesses 53 corresponding to the first protrusions 48 are formed. Therefore, the second protrusions 52 are provided in the recesses 53.

In the embodiment of the present invention, the central axis L1 of the first protrusion 48 having the perfectly circular ring shape matches the central axis L2 of the second protrusion 52. Stated otherwise, the center of the first protrusion 48 is coaxial with the center of the second protrusion 52.

Figure 8:
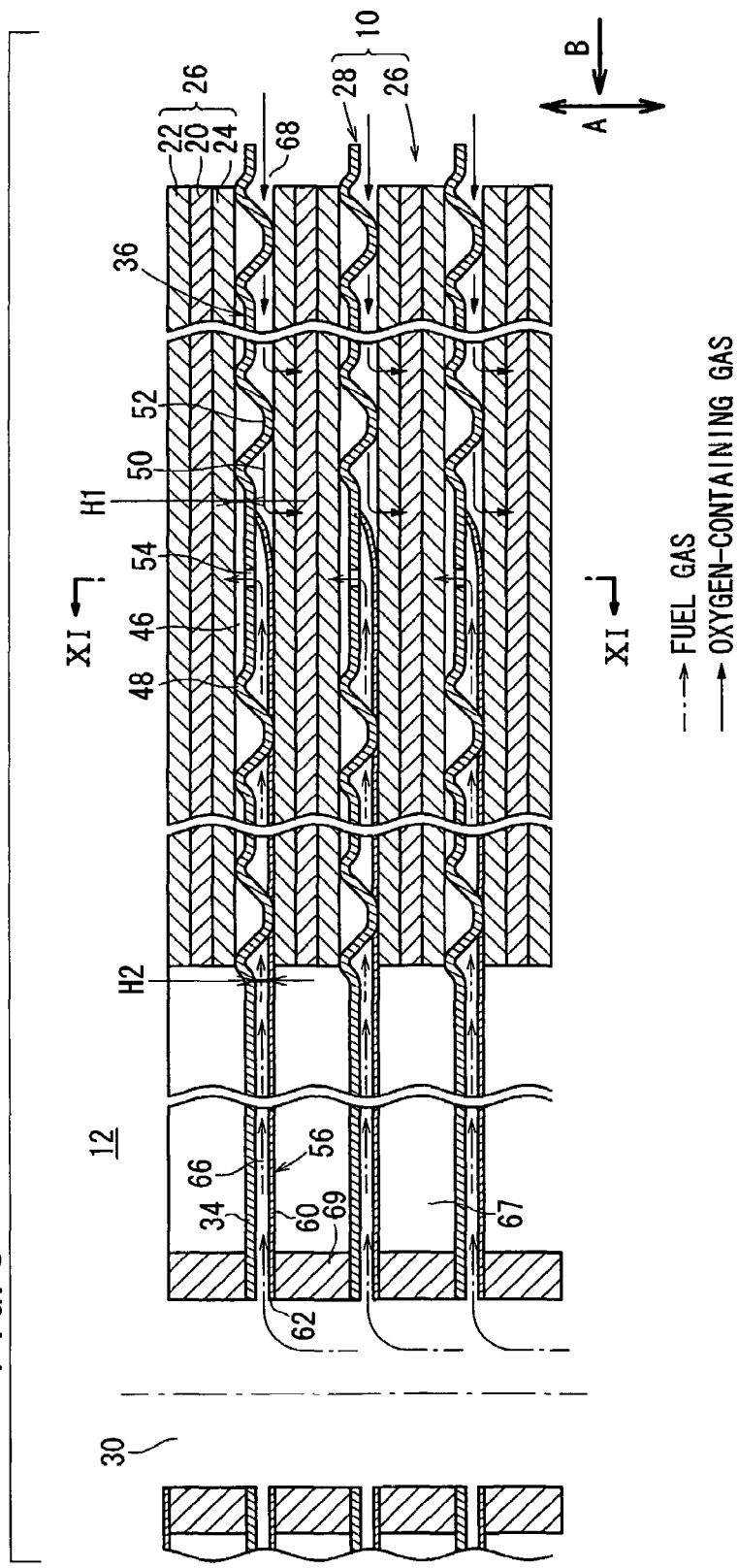
FIG. 8 is a cross sectional view showing the fuel cell stack.
Figure 9:
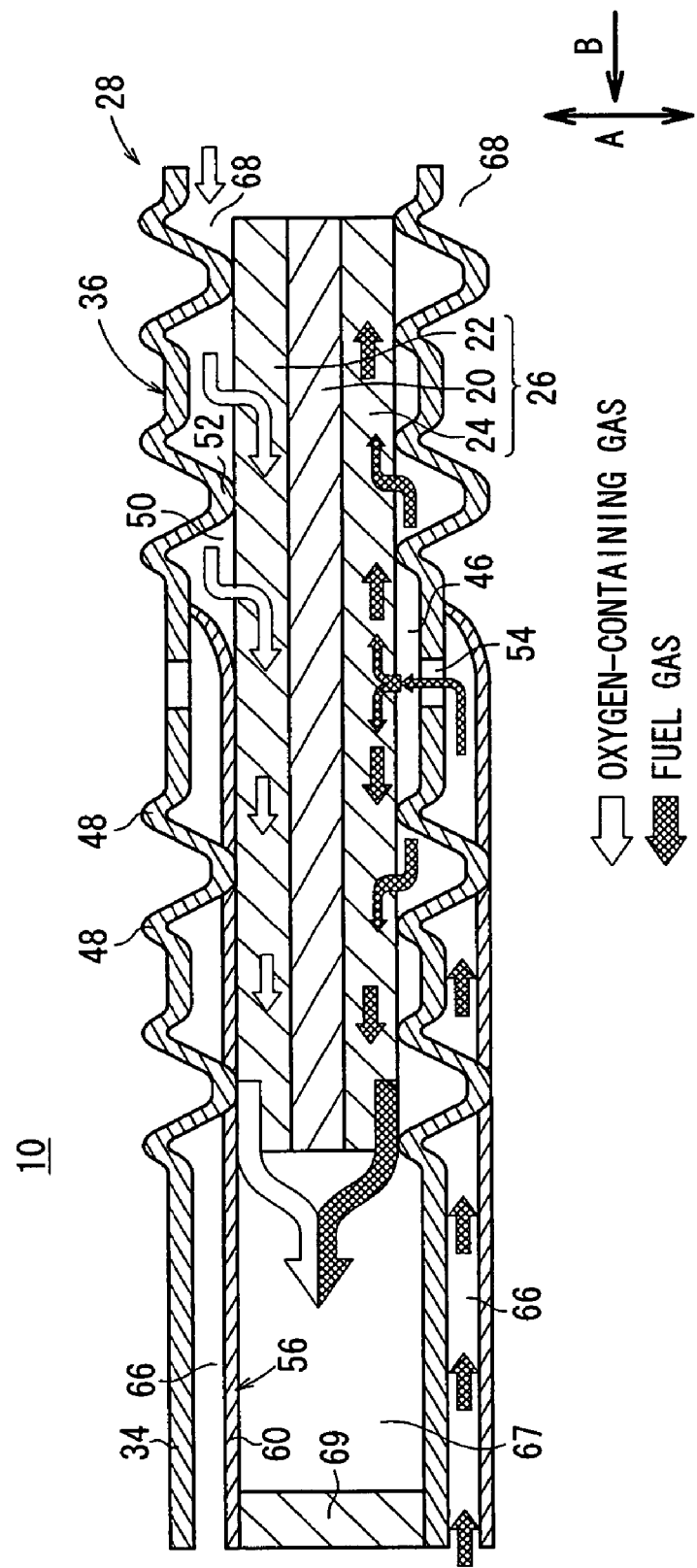
FIG. 9 is a cross sectional view schematically showing operation of the fuel cell.

As shown in FIGS. 8 and 9, a plurality of the first and second protrusions 48, 52 are provided, and the height H1 of the first protrusion 48 is smaller than the height H2 of the second protrusion 52 (H1<H2). Therefore, the volume of the oxygen-containing gas flow field 50 is larger than the volume of the fuel gas flow field 46.

The first protrusion 48 may be the mountain shaped protrusion, and the second protrusion 52 may be the ring shaped protrusion. In this case, it is preferable that the height of the ring shaped protrusion is larger than the height of the mountain shaped protrusion.

As shown in FIGS. 3 through 6, a fuel gas inlet 54 is provided in each of the circular disks 36. The fuel gas flows through the fuel gas inlet 54 into the fuel gas flow field 46. The fuel gas is supplied from the central region of the anode 24. The position of the fuel gas inlet 54 is determined by the pressure of the fuel gas and the pressure of the oxygen-containing gas. For example, the fuel gas inlet 54 is provided at the center of the circular disk 36. Alternatively, the fuel gas inlet 54 may be provided at an upstream position deviated from the center of the circular disk 36 in the flow direction of the oxygen-containing gas indicated by the arrow B.

Figure 10:
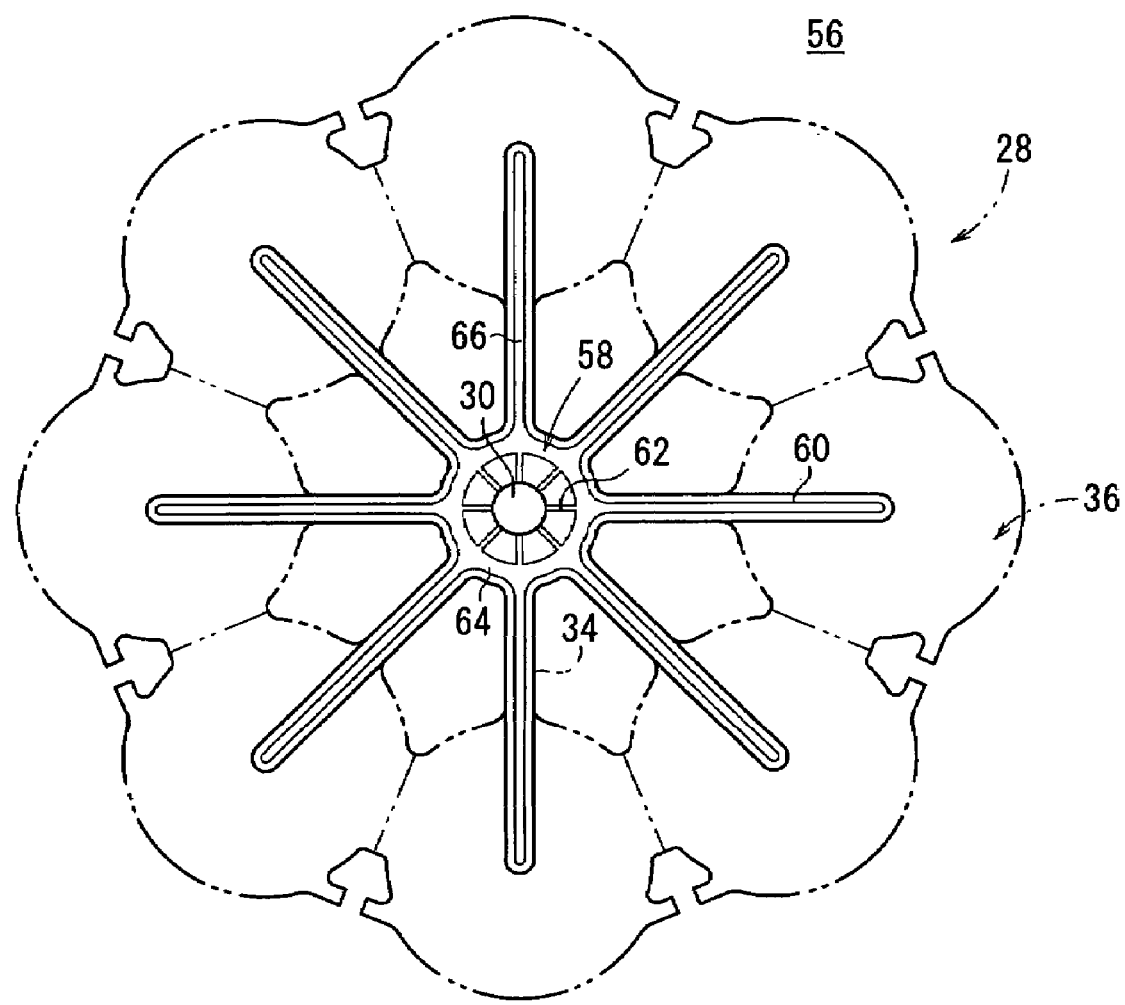
FIG. 10 is a view showing a channel member fixed to the separator.

A channel member 56 is fixed to the separator 28 by brazing or laser welding on a surface facing the cathode 22. As shown in FIG. 10, the channel member 56 includes a second small diameter end portion 58. The fuel gas supply passage 30 is formed at the center of the second small diameter end portion 58. Eight second bridges 60 extend radially from the second small diameter end portion 58. Each of the second bridges 60 is fixed to the first bridge 34 to the circular disk 36 of the separator 28 and reaches the fuel gas inlet 54.

Figure 11:
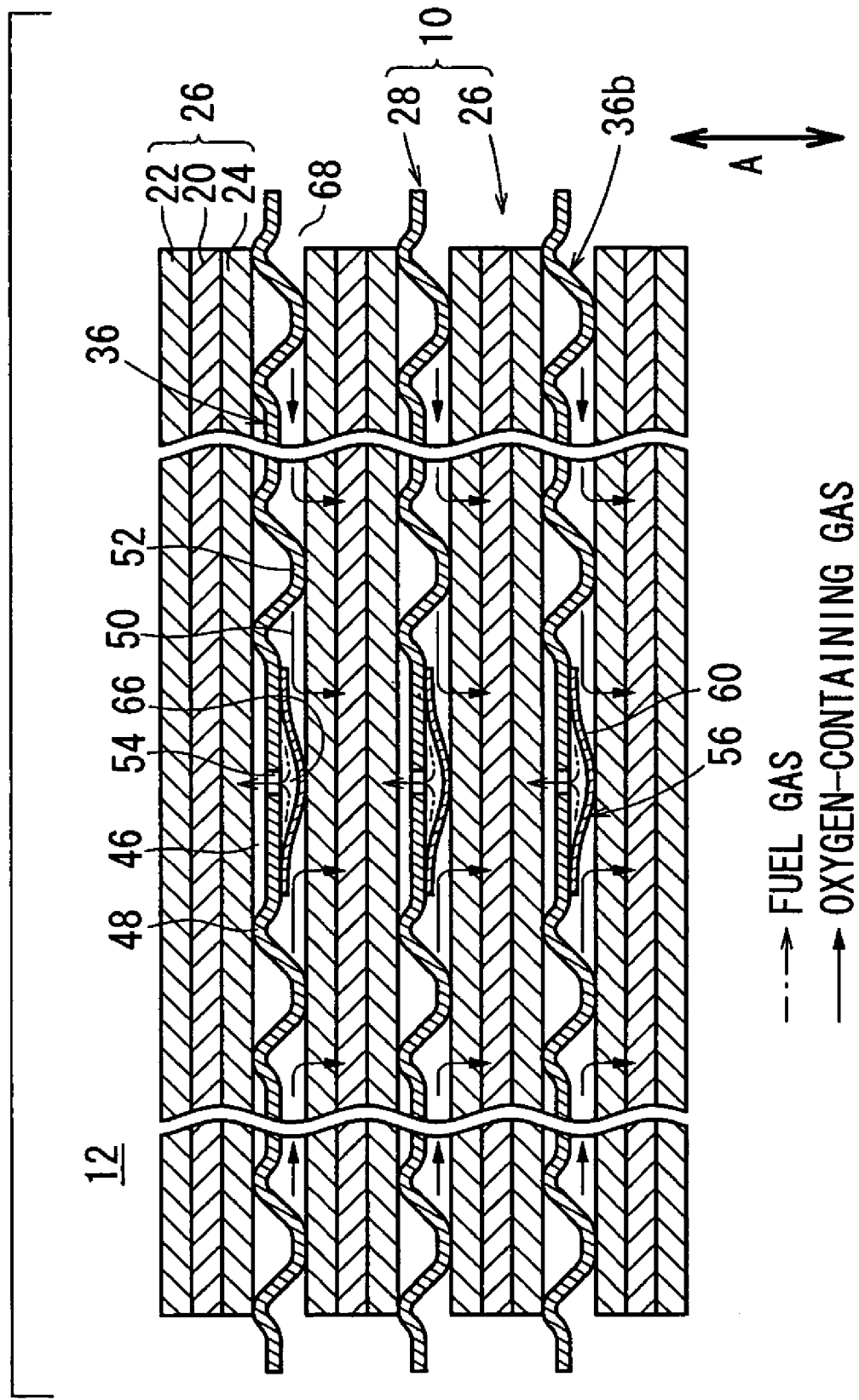
FIG. 11 is a cross sectional view showing the fuel cell, taken along a line XI-XI in FIG. 8.

A plurality of slits 62 are formed on the second small diameter end portion 58 of the channel member 56. The slits 62 are formed radially on a surface of the second small diameter end portion 58 which is joined to the separator 28. The slits 62 are connected to the fuel gas supply passage 30. Further, the slits 62 are connected to a recess 64 formed in the outer circumferential region of the second small diameter end portion 58. The recess 64 prevents the flow of the brazing material, and achieves the uniform flow of the fuel gas. A plurality of fuel gas supply channels 66 are formed between the first and second bridges 34, 60. Each of the fuel gas supply channels 66 is connected to the fuel gas flow field 46 through the slits 62 and the recess 64. As shown in FIG. 11, the channel member 56 joined to each of the separators 28 has a curved cross section so that the second bridge 60 can be deformed elastically in the stacking direction indicated by the arrow A.

As shown in FIGS. 8 and 9, the oxygen-containing gas flow field 50 is connected to the oxygen-containing gas supply unit 68. The oxygen-containing gas is supplied in the direction indicated by the arrow B through the space between the outer circumferential edge of the electrolyte electrode assembly 26 and the outer circumferential edge of the circular disk 36. The oxygen-containing gas supply unit 68 is provided between the extensions 40a, 40b of each of the circular disks 36. The baffle plate 44 provided in the space 42 between the adjacent extensions 40a, 40b prevents the entry of the oxygen-containing gas from the source other than the oxygen-containing gas supply unit 68.

As shown in FIG. 8, insulating seals 69 for sealing the fuel gas supply passage 30 is provided between the separators 28. For example, the insulating seals 69 are made of mica material, or ceramic material. Exhaust gas channels 67 extend through the fuel cells 10 in the stacking direction at positions internal from the respective circular disks 36.

As shown in FIGS. 1 and 2, the fuel cell stack 12 includes a plurality of fuel cells 10 stacked together, and circular end plates 70a, 70b provided at opposite ends in the stacking direction. The fuel cells 10 of the fuel cell stack 12 are tightened together by a tightening load applying mechanism 72 in the stacking direction.

The tightening load applying mechanism 72 includes a first tightening unit 74a for applying a first tightening load T1 to a position near the fuel gas supply passage 30, and a second tightening unit 74b for applying a second tightening load T2 to the electrolyte electrode assemblies 26. The second tightening load T2 is smaller than the first tightening load T1 (T1>T2).

The end plate 70a is insulated from the casing 14. A fuel gas supply port 76 is provided at the center of the end plate 70a. The fuel gas supply port 76 is connected to the fuel gas supply passage 30 in each of the fuel cells 10. The end plate 70a has two bolt insertion holes 78a. The fuel gas supply port 76 is positioned between the two bolt insertion holes 78a. The bolt insertion holes 78a are provided at positions corresponding to the exhaust gas channels 67 of the fuel cell stack 12.

Eight circular openings 80 are provided along a circular line which is concentric with the fuel gas supply port 76. That is, the circular openings 80 are arranged at positions corresponding to the respective electrolyte electrode assemblies 26. The circular openings 80 are connected to rectangular openings 82 extending toward the fuel gas supply port 76. The rectangular openings 82 are partially overlapped with the exhaust gas channels 67. Therefore, the exhaust gas is discharged from the rectangular openings 82.

The end plate 70b is a conductive member. As shown in FIG. 2, a connection terminal 84 protrudes axially from the center of the end plate 70b, and the end plate 70b has two bolt insertion holes 78b. The connection terminal 84 is positioned between the two bolt insertion holes 78b. The bolt insertion holes 78a are in alignment with the bolt insertion holes 78b. Two tightening bolts (tightening members) 86 are inserted into the bolt insertion holes 78a, 78b. The tightening bolts 86 are insulated from the end plate 70b. Tip ends of the tightening bolts 86 are screwed into nuts 88 to form the first tightening unit 74a. The first tightening unit 74a applies the desired tightening load for tightening the fuel cells 10 between the end plates 70a, 70b.

The connection terminal 84 is electrically connected to an output terminal 92a fixed to the casing 14.

The second tightening unit 74b is provided in each of the circular openings 80 of the end plate 70a. The second tightening unit 74b includes a presser member 94 as a terminal plate. The presser member 94 electrically contacts the end of the fuel cell stack 12 in the stacking direction. One end of a spring 96 contacts the presser member 94, and the other end of the spring 96 is supported by an inner wall of the casing 14. The spring 96 has a spring load which is smaller than the first tightening load T1. For example, the spring 96 is made of ceramics to prevent the influence of heat at the time of power generation, and to provide insulation.

A connection conductor 98 is connected to an end of each presser member 94. The connecting conductor 98 and one end of a tightening bolt 86 are electrically connected through a conductive wire 100. The other end (head) of the tightening bolt 86 is positioned near the connection terminal 84, and electrically connected to the output terminal 92b through a conductive wire 102. The output terminals 92a, 92b are arranged in parallel, and are adjacent to each other. The output terminals 92a, 92b are also electrically insulated from each other and fixed to the casing 14.

The casing 14 has an air supply port 104 adjacent to the output terminals 92a, 92b. An exhaust port 106 is provided on the side of the other end plate 70a. A fuel gas supply port 108 is provided adjacent to the exhaust port 106. Therefore, heat is exchanged between the exhaust gas and the fuel gas. The fuel gas supply port 108 is connected to the fuel gas supply passage 30 through a reformer 110 as necessary. A heat exchanger 111 is provided around the reformer 110.

Next, operation of the fuel cell stack 12 will be described below.

As shown in FIG. 3, in assembling the fuel cell 10, firstly, the separator 28 is joined to the channel member 56 on its surface facing the cathode 22. Therefore, each fuel gas supply channel 66 connected to the fuel gas supply passage 30 is formed between the separator 28 and the channel member 56. Each fuel gas supply channel 66 is connected to the fuel gas flow field 46 through the fuel gas inlet 54 (see FIG. 8). The ring shaped insulating seal 69 is provided on each of the separators 28 around the fuel gas supply passage 30.

In this manner, the separator 28 is fabricated. The eight electrolyte electrode assemblies 26 are interposed between the separators 28 to form the fuel cell 10. As shown in FIGS. 3 and 4, the electrolyte electrode assemblies 26 are interposed between the surface 36a of one separator 28 and the surface 36b of the other separator 28. The fuel gas inlet 54 of the circular disk 36 is positioned at the center in each of the anodes 24.

A plurality of the fuel cells 10 are stacked in the direction indicated by the arrow A, and the end plates 70a, 70b are provided at opposite ends in the stacking direction. As shown in FIGS. 1 and 2, the tightening bolts 86 are inserted into the respective bolt insertion holes 78a, 78b of the end plates 70a, 70b. Tip ends of the tightening bolts 86 are screwed into the nuts 88. Thus, the fuel cell stack 12 is produced. The components of the fuel cell stack 12 are tightened together by the tightening load applying mechanism 72 in the stacking direction, and the fuel cell stack 12 is attached in the casing 14 (see FIG. 2).

Then, a fuel gas such as a hydrogen-containing gas is supplied to the fuel gas supply port 108 of the casing 14, and an oxygen-containing gas (hereinafter also referred to as the air) is supplied to the air supply port 104 of the casing 14. The fuel gas flows through the reformer 110, and is supplied to the fuel gas supply passage 30 of the fuel cell stack 12. The fuel gas flows in the stacking direction indicated by the arrow A, and flows through the slit 62 of the separator 28 in each of the fuel cells 10, and flows into the fuel gas supply channels 66 (see FIG. 8).

The fuel gas flowing along one of the fuel gas supply channels 66 between the first and second bridges 34, 60 flows into the fuel gas flow field 46 through the fuel gas inlet 54 of the circular disk 36. The fuel gas inlet 54 is positioned at the substantially central position of the anode 24 in each of the electrolyte electrode assemblies 26. Alternatively, the fuel gas inlet 54 may be provided at an upstream position deviated from the central position of the anode 24 in the flow direction of the oxygen-containing gas indicated by the arrow B. Therefore, the fuel gas is supplied to the central region of the anode 24 from the fuel gas inlet 54. The fuel gas flows from the central region of the anode 24 to the outer circumferential region of the anode 24 (see FIG. 9).

The oxygen-containing gas is supplied to the oxygen-containing gas supply unit 68 in the outer circumferential region in each of the fuel cells 10. The oxygen-containing gas flows into the space between the outer circumferential region of the electrolyte electrode assembly 26 and the outer circumferential region of the circular disk 36 in the direction indicated by the arrow B, and flows toward the oxygen-containing gas flow field 50. As shown in FIGS. 8 and 9, in the oxygen-containing gas flow field 50, the oxygen-containing gas flows from one end of the outer circumferential region (outer region of the separator 28) to the other end of the outer circumferential region (central region of the separator 28) of the cathode 22 of the electrolyte electrode assembly 26.

Thus, in the electrolyte electrode assembly 26, the fuel gas flows from the central region to the outer circumferential region of the anode 24, and the oxygen-containing gas flows in one direction indicated by the arrow B on the electrode surface of the cathode 22 (see FIGS. 9 and 11). At this time, oxygen ions flow through the electrolyte 20 toward the anode 24 for generating electricity by electrochemical reactions.

The fuel cells 10 are connected in series in the stacking direction indicated by the arrow A. As shown in FIG. 2, one of the poles is connected from the connection terminal 84 of the electrically conductive end plate 70b to the output terminal 92a through a conductive wire 90. The other pole is connected from the tightening bolts 86 to the output terminal 92b through the conductive wires 102. Thus, the electrical energy can be collected from the output terminals 92a, 92b.

After the fuel gas and the oxygen-containing gas are consumed in the reactions, the fuel gas and the oxygen-containing gas flow toward the outer circumferential regions of the anode 24 and the cathode 22, respectively, in each of the electrolyte electrode assemblies 26, and are mixed together. The mixed gas flows as an exhaust gas into the exhaust gas channels 67 extending through the separators 28, and flows in the stacking direction. Then, the exhaust gas is discharged to the outside of the casing 14 from the exhaust port 106.

In the first embodiment, the first and second protrusions 48, 52 are fabricated on the surfaces 36a, 36b of each of the circular disks 36 of the separator 28. The first protrusion 48 is coaxial with the second protrusion 52, and the shape of the first protrusion 48 is different from the shape of the second protrusion 52. The first protrusions 48 contact the anode 24, and the second protrusions 52 contact the cathode 22.

Since the first and second protrusions 48, 52 are coaxial with each other, and provided on a single plate, the distance between the electrolyte electrode assembly 26 and the first and second protrusions 48, 52 as the current collectors is small, and the load in the stacking direction is transmitted efficiently. Further, the dimensional variation of the height does not affect the dimension in the stacking direction since the variation is absorbed by the first and second protrusions 48, 52. Thus, the load is uniformly applied to the electrolyte electrode assembly 26. Further, in the presence of the first and second protrusions 48, 52, the electrolyte electrode assembly 26 tightly contacts the separators 28. Therefore, the current loss between the electrolyte electrode assembly 26 and the separators 28 is reduced, and improvement in the current collection is achieved efficiency.

Further, the load in the stacking direction is directly applied to the first and second protrusions 48, 52, and flat portions are formed between the first protrusions 48 and between the second protrusions 52, respectively. The flat portions have a low rigidity, and are deformed easily. Therefore, the load in the stacking direction can be transmitted to the electrolyte electrode assembly 26, and the distortion of the separator 28 is reduced. Further, variations in the heights of the first and second protrusions 48, 52 can be absorbed effectively. Since the sizes of the first and second protrusions 48, 52 are small, large area of the electrolyte electrode assembly 26 is exposed to the fuel gas and the oxygen-containing gas for inducing the desired reactions.

Further, since the shape of the first protrusion 48 is different from the shape of the second protrusion 52, the volume of the fuel gas flow field 46 and the volume of the oxygen-containing gas flow field 50 can be determined separately. Thus, simply by determining the heights of the first and second protrusions 48, 52 separately, it is possible to desirably determine the flow rates of the fuel gas and the oxygen-containing gas for inducing the desired power generation reaction, and improvement in the power generation efficiency is achieved.

Since press forming is used for fabricating the separators 28 having the first and second protrusions 48, 52 simply and successively, large scale production of the separators 28 is achieved easily at low cost. Further, since it is possible to form the first and second protrusions 48, 52 using dies, the first protrusions 48 having substantially the same shape, and the second protrusions 52 having substantially the same shape are formed on each of the separators 28. Stated otherwise, the high accuracy in the shapes of the first and second protrusions 48, 52 is achieved advantageously.

The first and second protrusions 48, 52 may be fabricated by an etching process. In this process, even if the first and second protrusions 48, 52 have very small sizes, or have complicated shapes, the high accuracy in the shapes of the first and second protrusions 48, 52 is achieved.

Alternatively, the first and second protrusions 48, 52 may be fabricated by a cutting process. In this process, even in the case of fabricating a thick separator 28 for producing a large fuel cell, it is possible to accurately form the first and second protrusions 48, 52.

Figure 12:
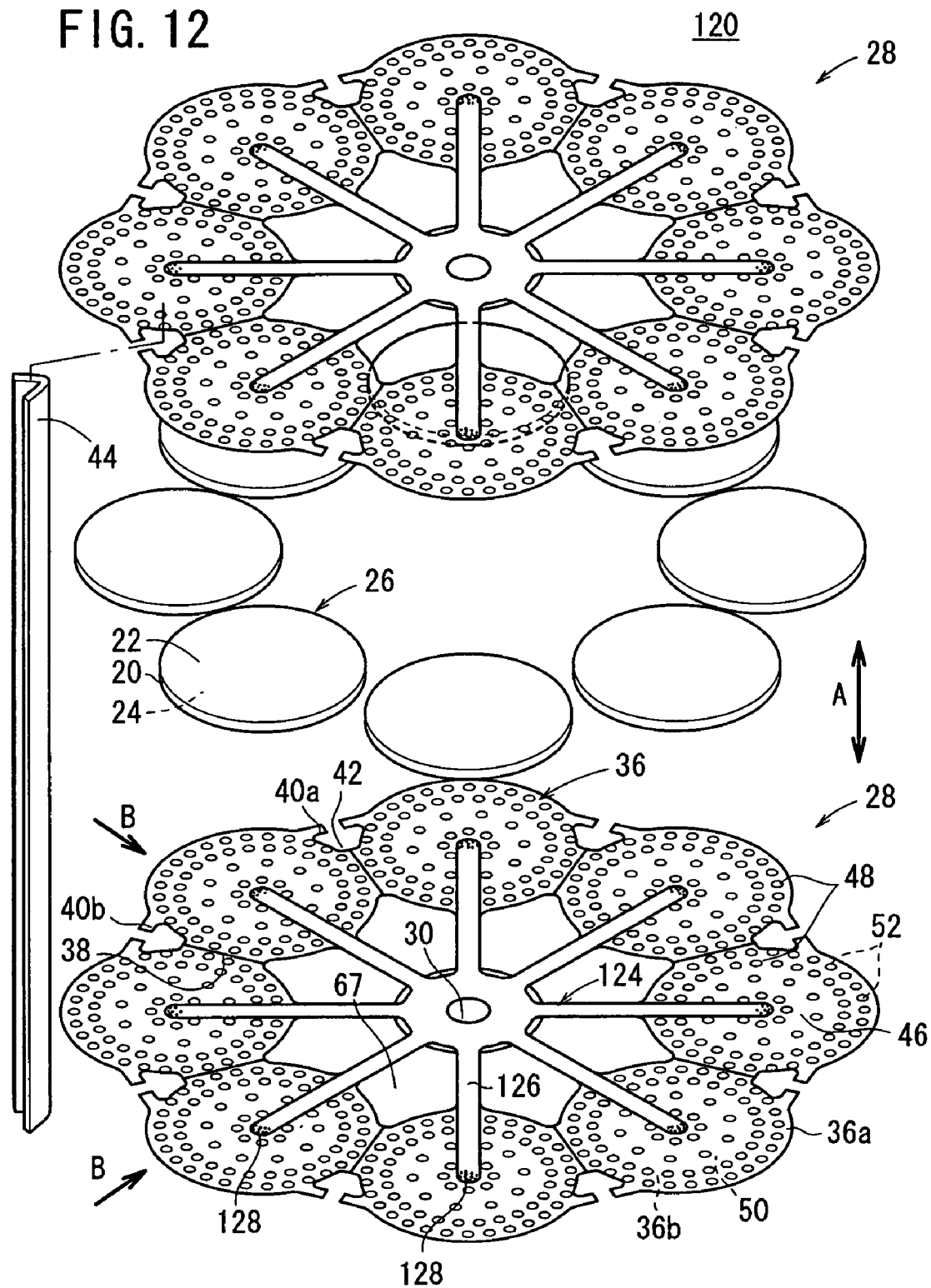
FIG. 12 is an exploded perspective view showing a fuel cell according to a second embodiment of the present invention.
Figure 13:
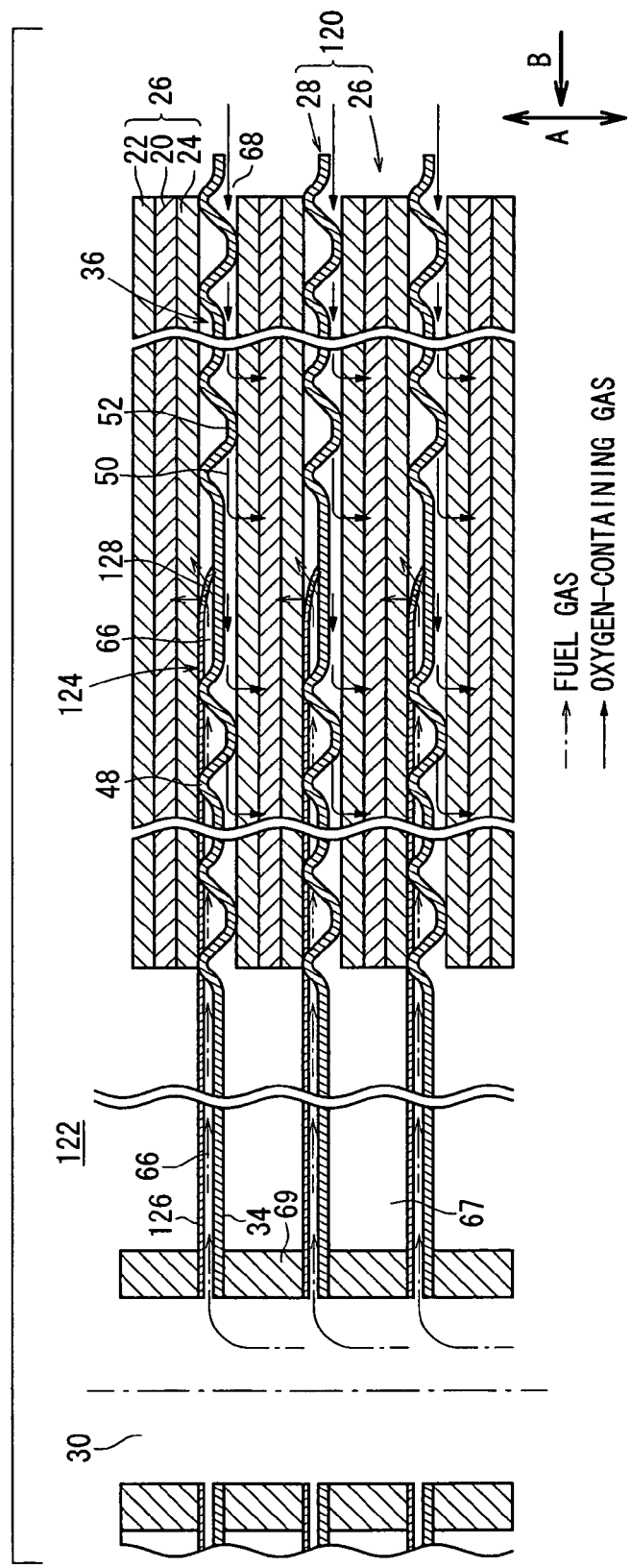
FIG. 13 is a cross sectional view showing a fuel cell stack formed by stacking a plurality of the fuel cells.
Figure 14:
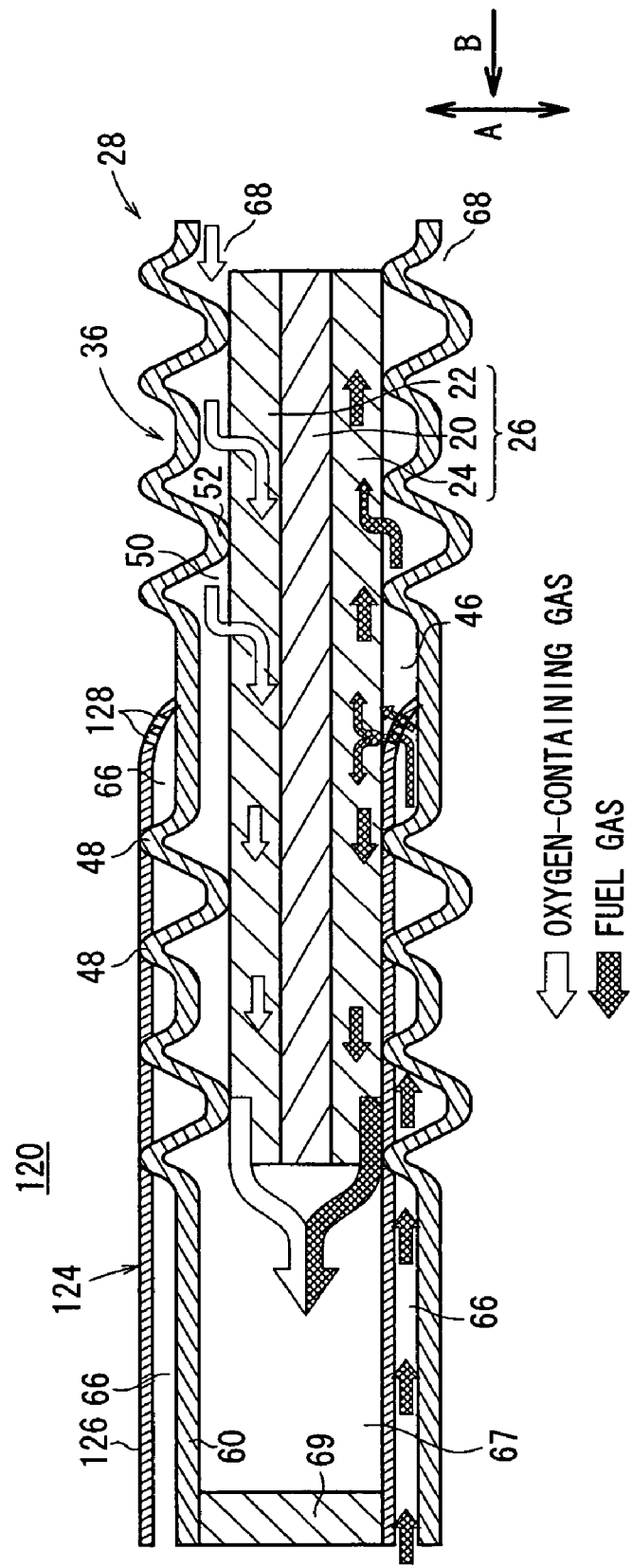
FIG. 14 is a cross sectional view schematically showing operation of the fuel cell.

FIG. 12 is an exploded perspective view showing a fuel cell 120 according to a second embodiment of the present invention. FIG. 13 is a cross sectional view showing a fuel cell stack 122 formed by stacking a plurality of the fuel cells 120. FIG. 14 is a cross sectional view schematically showing operation of the fuel cell 120. The constituent elements that are identical to those of the fuel cell 10 according to the first embodiment are labeled with the same reference numeral, and description thereof will be omitted.

A channel member 124 is fixed to each of the separators 28 of the fuel cell 120, on a surface facing the anode 24. The channel member 124 includes second bridges 126 fixed to the first bridges 34 of the separator 28. A plurality of fuel gas supply channels 66 are formed between the first and second bridges 34, 126. Tip ends of the respective second bridges 126 terminate at positions near the centers of the anodes 24 of the electrolyte electrode assemblies 26. A plurality of fuel gas inlets 128 are formed at the tip ends of the second bridges 126. The fuel gas flows through the fuel gas inlets 128 toward the anodes 24. The circular disks 36 of the separators 28 do not have any fuel gas inlet 54 of the first embodiment.

In the second embodiment of the present invention, the fuel gas supplied to the fuel gas supply passage 30 flows along the fuel gas supply channels 66 between the separator 28 and the channel member 124. Then, the fuel gas flows toward the anodes 24 through the fuel gas inlets 128 formed at the tip ends of the channel member 124.

Figure 15:
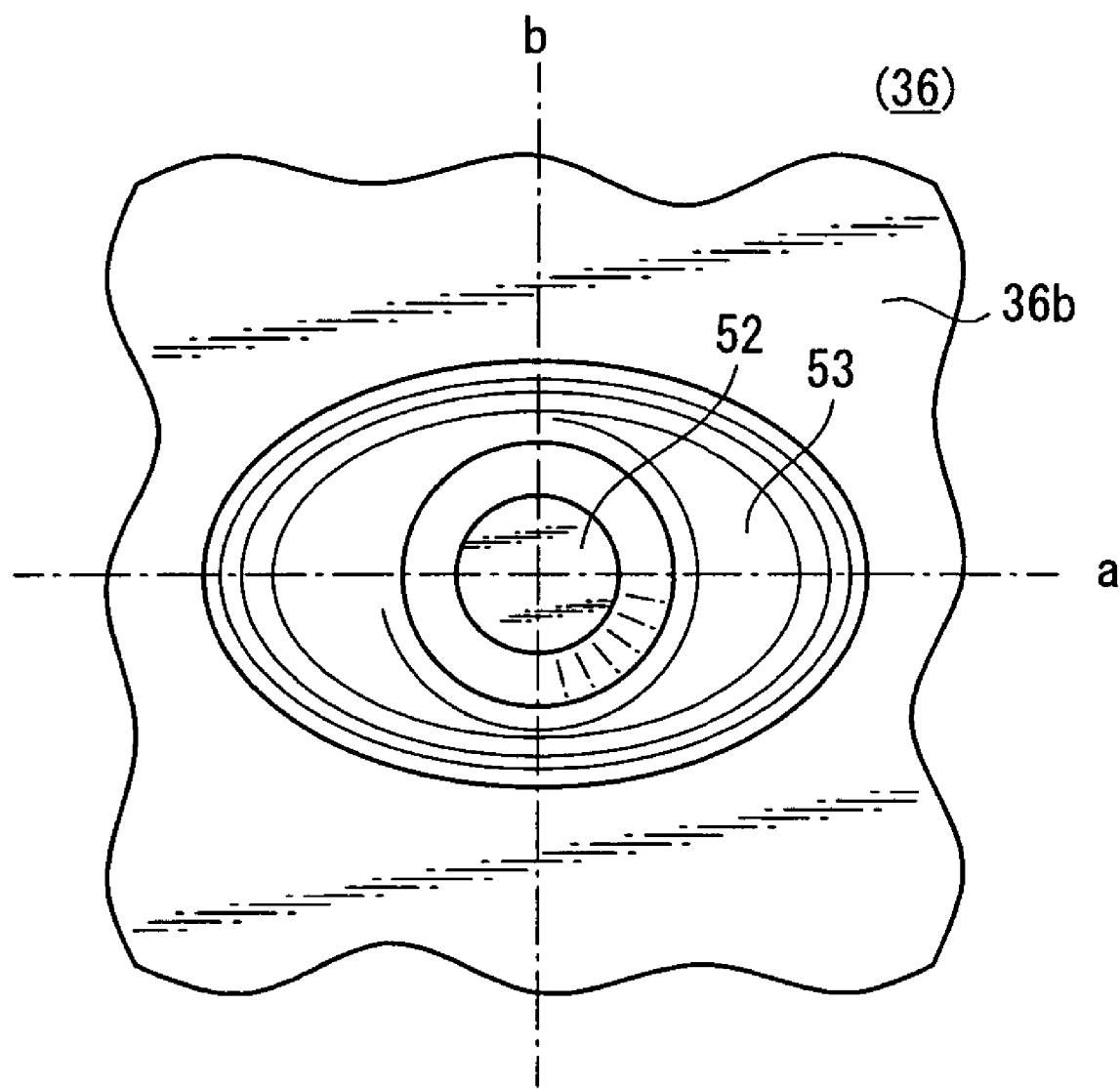
FIG. 15 is a plan view showing first and second protrusions that are different from the first and second protrusions shown in FIG. 7.

In the first and second embodiments, as shown in FIG. 7, the first protrusion 48 has a ring shape perfectly circular (annular shape). Alternatively, for example, as shown in FIG. 15, the first protrusion 48 (recess 53) may have an oval ring shape. In this case, assuming that the intersection of the major diameter "a" and the minor diameter "b" is the center of the first protrusion 48, if an axis extending through the center matches the central axis of the second protrusion 52, "the first and second protrusions 48, 52 are coaxial".

In an example shown in FIG. 7, the second protrusion 52 has a conical shape, and a flat surface on its top. The cross section of the second protrusion 52 in the horizontal direction (e.g., the top surface) has a perfectly circular shape. However, the "mountain shaped protrusion" of the present invention is not limited in this respect. The mountain shaped protrusion may include a protrusion having a vertical cross section (cross section along the height of the protrusion) in a trapezoidal shape. That is, the mountain shaped protrusion may include a protrusion having a horizontal cross section (e.g., the top surface) in an oval shape.

Figure 16:
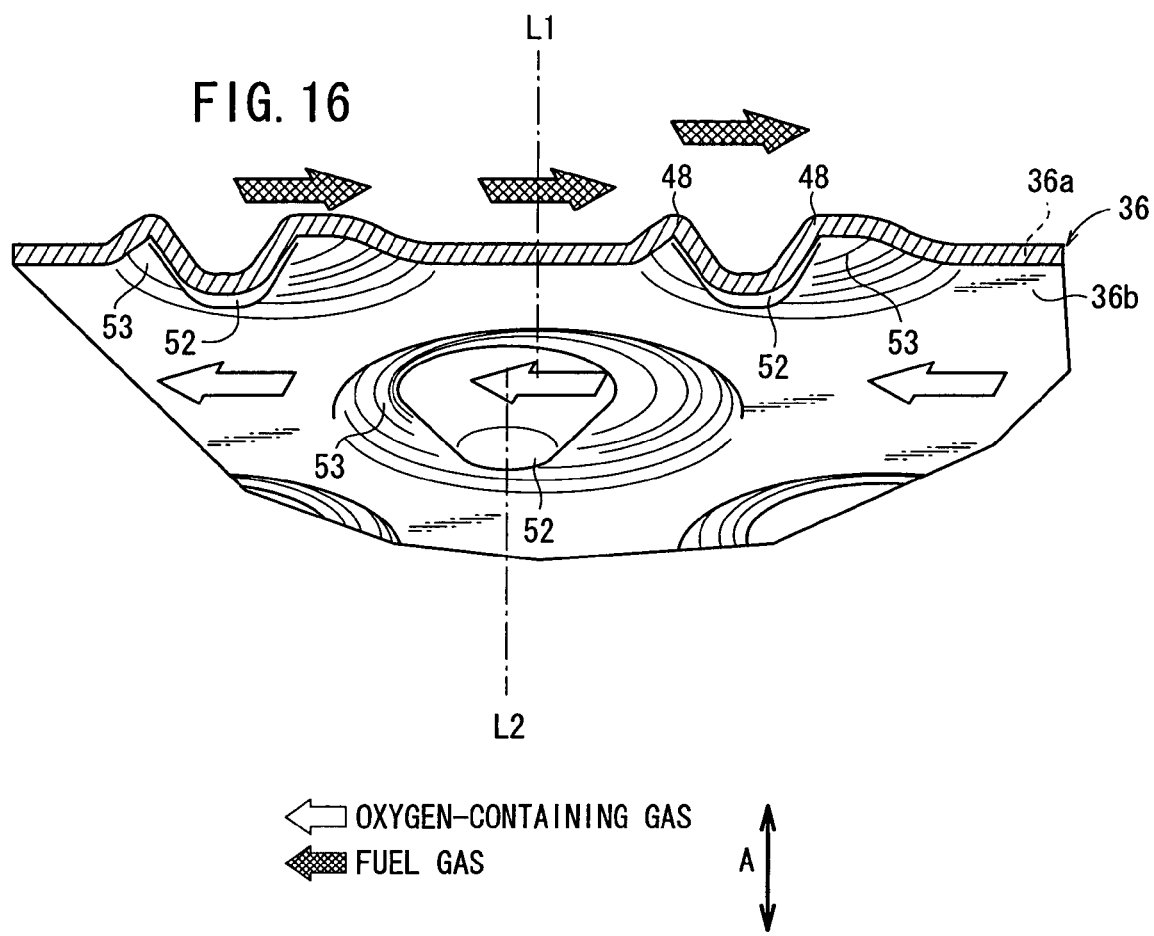
FIG. 16 is a perspective view showing first and second protrusions that are different from the first and second protrusions shown in FIGS. 7 and 15.
Figure 17:
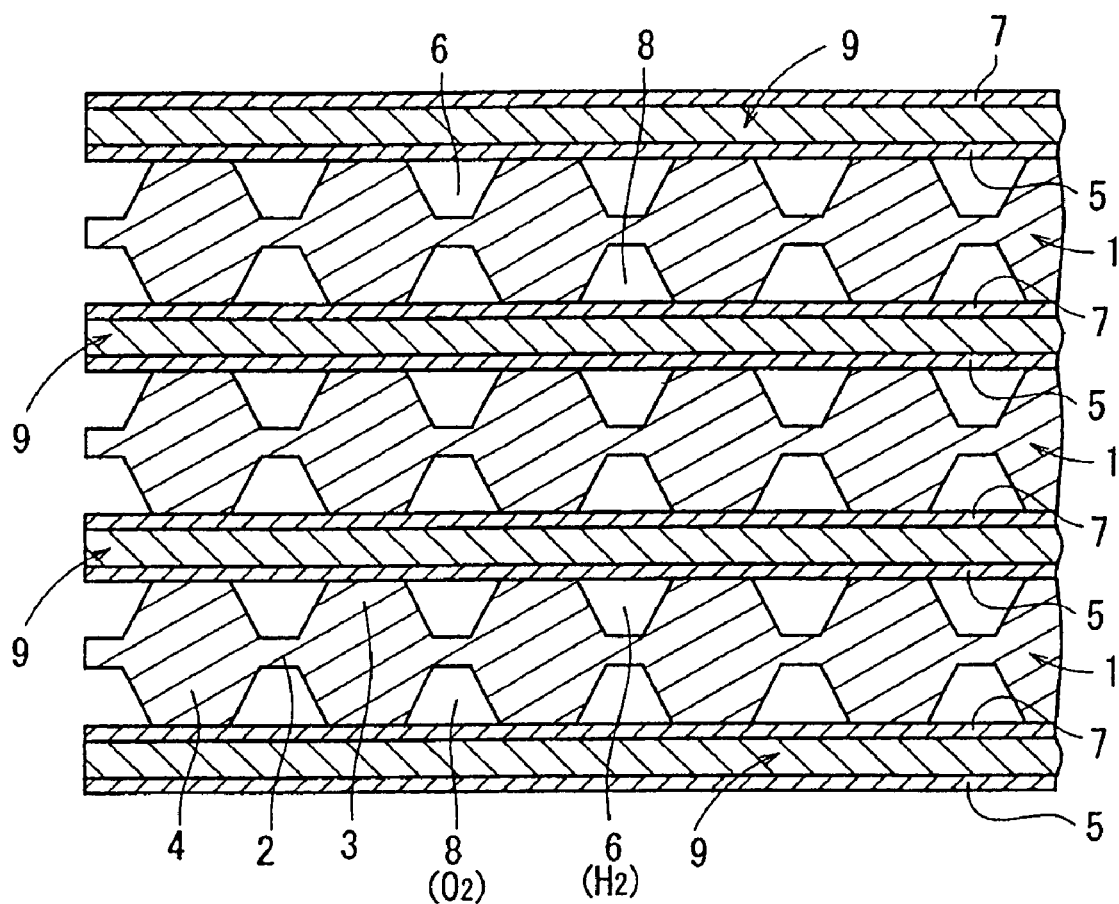
FIG. 17 is a cross sectional view showing a separator of a fuel cell disclosed in Japanese Laid-Open Patent Publication No. 2002-75408.

Further, in FIG. 7, the first and second protrusions 48, 52 are coaxial, i.e., the central axis L1 of the ring shaped first protrusion 48 matches the central axis L2 of the second protrusion 52. However, it is not essential that the central axis L1 of the first protrusion 48 matches the central axis L2 of the second protrusion 52, i.e., the first and second protrusions 48, 52 are not necessarily coaxial with each other. For example, as shown in FIG. 16, the central axis L2 of the second protrusion 52 may be deviated from the central axis L1 of the first protrusion 48. It is a matter of course that the first protrusion 48 may have an oval ring shape in this case, and the second protrusion 52 may have a horizontal cross section in an oval shape.

The invention has been particularly shown and described with reference to preferred embodiments, it will be understood that variations and modifications can be effected thereto by those skilled in the art without departing from the spirit and scope of the invention as defined by the appended claims.

What is claimed is:

1. A fuel cell comprising an electrolyte electrode assembly and a pair of separators sandwiching said electrolyte electrode assembly, said electrolyte electrode assembly including an anode, a cathode, and an electrolyte interposed between said anode and said cathode, wherein
    a plurality of first protrusions are provided on a first surface of said separator such that a first space is formed between said first protrusions and said electrolyte electrode assembly;
    a plurality of second protrusions are provided on a second surface of said separator such that a second space is formed between said second protrusions and said electrolyte electrode assembly;
    one of said first and second protrusions is an annular protrusion and the other of said first and second protrusions is a mountain shaped protrusion; and
    said mountain shaped protrusion is disposed in a recess formed by said annular protrusion.

2. A fuel cell according to claim 1, wherein said first space forms a fuel gas flow field for supplying a fuel gas along an electrode surface of said anode, and said second space forms an oxygen-containing gas flow field for supplying an oxygen-containing gas along an electrode surface of said cathode.

3. A fuel cell according to claim 1, wherein said first protrusion contacts said anode, and said second protrusion contacts said cathode.

4. A fuel cell according to claim 1, wherein the height of said first protrusion is smaller than the height of said second protrusion.

5. A fuel cell according to claim 1, wherein said first protrusion and said second protrusion are coaxial with each other.

6. A fuel cell according to claim 1, wherein the vertical cross section of said mountain shaped protrusion has a trapezoidal shape.

7. A fuel cell according to claim 1, wherein said recess has a perfectly circular shape.

8. A fuel cell according to claim 1, wherein said recess has an oval shape.

9. A fuel cell according to claim 1, wherein said separator comprises a single plate, and said first protrusion and said second protrusion are provided on said plate by press forming.

10. A fuel cell according to claim 1, wherein said separator comprises a single plate, and said first protrusion and said second protrusion are provided on said plate by an etching process.

11. A fuel cell according to claim 1, wherein said separator comprises a single plate, and said first protrusion and said second protrusion are provided on said plate by a cutting process.

* * * * *